US007894461B2

(12) United States Patent
Pei et al.

(10) Patent No.: US 7,894,461 B2
(45) Date of Patent: Feb. 22, 2011

(54) METHODS AND APPARATUS TO INFER THE STATUS OF BORDER GATEWAY PROTOCOL SESSIONS

(75) Inventors: Dan Pei, Jersey City, NJ (US); Ricardo Oliveira, Los Angeles, CA (US); Walter Willinger, Madison, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 169 days.

(21) Appl. No.: 12/275,047

(22) Filed: Nov. 20, 2008

(65) Prior Publication Data

US 2010/0124221 A1 May 20, 2010

(51) Int. Cl.
*H04L 12/56* (2006.01)
*G06F 15/16* (2006.01)

(52) U.S. Cl. ........................ 370/401; 370/469; 709/227

(58) Field of Classification Search ....................... None
See application file for complete search history.

(56) References Cited

U.S. PATENT DOCUMENTS

| | | | | |
|---|---|---|---|---|
| 6,038,594 | A | 3/2000 | Puente et al. | |
| 6,173,324 | B1 | 1/2001 | D'Souza | |
| 6,392,997 | B1 | 5/2002 | Chen | |
| 6,751,664 | B1 | 6/2004 | Kogan et al. | |
| 6,820,132 | B1 | 11/2004 | Puente et al. | |
| 6,993,593 | B2 * | 1/2006 | Iwata | 709/238 |
| 7,035,202 | B2 | 4/2006 | Callon | |
| 7,080,161 | B2 | 7/2006 | Leddy et al. | |
| 7,093,160 | B2 | 8/2006 | Lau et al. | |
| 7,139,242 | B2 * | 11/2006 | Bays | 370/238 |
| 7,286,479 | B2 * | 10/2007 | Bragg | 370/238 |
| 7,336,613 | B2 | 2/2008 | Lloyd et al. | |
| 7,349,994 | B2 | 3/2008 | Balonado et al. | |
| 7,369,556 | B1 * | 5/2008 | Rekhter et al. | 370/392 |
| 7,406,539 | B2 | 7/2008 | Baldonado et al. | |
| 7,420,958 | B1 * | 9/2008 | Marques | 370/351 |
| 7,593,395 | B2 * | 9/2009 | Ould-Brahim | 370/389 |
| 7,668,966 | B2 * | 2/2010 | Klinker et al. | 709/232 |
| 7,688,819 | B2 * | 3/2010 | Ramaiah et al. | 370/389 |
| 2006/0291446 | A1 | 12/2006 | Caldwell et al. | |

(Continued)

OTHER PUBLICATIONS

Understanding BGP Session Failures in a Large ISP; Pei, et al.; Proceedings of IEEE Infocomm, 2007; 9 pages.

*Primary Examiner*—Chi H Pham
*Assistant Examiner*—Soon-Dong D Hyun
(74) *Attorney, Agent, or Firm*—Hanley, Flight & Zimmerman, LLC

(57) ABSTRACT

Methods and apparatus to infer the status of BGP sessions are disclosed. A disclosed example method comprises querying a configuration file of a router of a first AS to identify a BGP session to a second AS, querying the file to determine whether the BGP session is a single hop, when the BGP session is a single hop, setting a status flag to a first value, querying the file to determine whether there is a valid IP configuration for the BGP session, when there is a valid IP configuration, setting the status flag to a second value, querying a router syslog file for the router to identify a syslog message associated with the BGP session, determining whether the session is stale, and when the session is not stale and the status flag is set to the second value, adding the second AS to a list of actual AS neighbors.

26 Claims, 5 Drawing Sheets

U.S. PATENT DOCUMENTS

| | | | |
|---|---|---|---|
| 2007/0058631 | A1 | 3/2007 | Mortier et al. |
| 2007/0133406 | A1 | 6/2007 | Vasseur |
| 2007/0180104 | A1 | 8/2007 | Filsfils |
| 2007/0180105 | A1 | 8/2007 | Filsfils |
| 2007/0207591 | A1 | 9/2007 | Rahman |
| 2007/0214280 | A1 | 9/2007 | Patel |
| 2007/0217419 | A1 | 9/2007 | Vasseur |
| 2008/0089231 | A1 | 4/2008 | Appanna |
| 2008/0089348 | A1 | 4/2008 | Appanna |

* cited by examiner

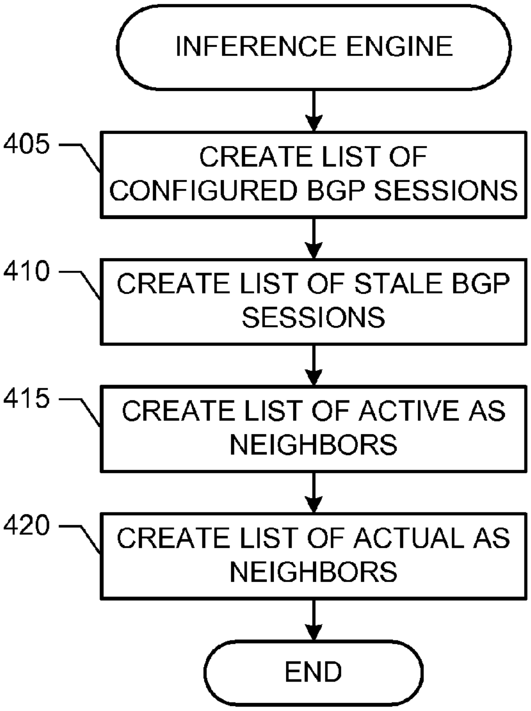

FIG. 4

```
      /* first phase, collect all AS neighbors in config */
      For each router R
505           For each line of configuration file                   510
  512             If line matches "neighbor <X> remote-as <Y>", then
                          Hash_IP2AS{R,X}= Y
                          Hash_ValidIP{R,X}=0                                       515
  517             If line matches "neighbor <X> remote-as <Y> ebgp-multihop <n>", then
                          Hash_IP2AS{R,X}= Y
                          Hash_ValidIP{R,X}=1
              End For
      End For

      /* second phase, find out which AS neighbors have a valid interface */
      For each router R
520           For each line of configuration file                   525
  527             If line matches "ip address <Z> <M>", then
                          For each X in keys of Hash_IP2AS of R
                                  If X inside M then Hash_ValidIP{R,X}=1
                          End For                                   530
  532             If line matches "ip route <Z> <M> <I>", then
                          For each X in keys of Hash_IP2AS of R
                                  If X inside of M then Hash_ValidIP{R,X}=1
                          End For
              End For
      End For
```

FIG. 5

```
605 ——— For each BGP session identifed in file (e.g., each combination of R and X),
        find most recent BGPmessage
    610 ——— Ts=gettimestamp(message);
    615 ——— If(message is Peer Down && Ts < (Now – 1 month))
    620 ———         Hash_staleIP{R,X}=1
    625 ——— Else if(Ts < (Now – 1 year))
    630 ———         Hash_staleIP{R,X}=1
            End If
        End For
```

FIG. 6

```
705 ——— For each iBGP entry
710 ———         Extract last AS hop N from ASPATH BGP attribute
715 ———         Hash_ValidNeighbor{N}=1
        End For
```

FIG. 7

```
        NEIB = { }
805 ——— For each R,X in keys of Hash_ValidIP
    810 ——— If (Hash_ValidIP{R,X}==1 && Hash_staleIP{R,X}!=1)
    815 ———         Y=Hash_IP2AS{R,X}
    820 ———         Push(Y,NEIB)
            End If
        End  For

    {   For each Y in Hash_ValidNeighbor not in NEIB
825 {           Push(Y,NEIB)
    {   End For
```

FIG. 8

METHODS AND APPARATUS TO INFER THE STATUS OF BORDER GATEWAY PROTOCOL SESSIONS

FIELD OF THE DISCLOSURE

This disclosure relates generally to border gateway protocols (BGPs) and, more particularly, to methods and apparatus to infer the status of BGP sessions.

BACKGROUND

The Internet is implemented as a plurality of autonomous systems (ASes) that are interconnected via a plurality of routers and communication paths. BGP sessions are typically used between the routers of different ASes to identify and select routes between the ASes to, for example, transport user data received at a first AS to a destination associated with a second AS.

BRIEF DESCRIPTION OF THE DRAWINGS

FIG. 4 is a flowchart representative of an example process that may be carried out to implement the example BGP session analyzer of FIGS. 1 and/or 2.

FIGS. 5-8 are pseudo-code representative of example processes that may be carried out to implement the example BGP session analyzer of FIGS. 1 and/or 2.

DETAILED DESCRIPTION

Example methods and apparatus to infer the status of border gateway protocol (BGP) sessions are disclosed. A disclosed example method includes querying a router configuration file associated with a router of a first autonomous system (AS) to identify a BGP session between the first AS and a second AS, querying the router configuration file to determine whether the BGP session is a single hop BGP session, when the BGP session is a single hop BGP session, setting a status flag associated with the BGP session to a first value, querying the router configuration file to determine whether the first AS and the second AS have a valid Internet protocol (IP) configuration for the identified BGP session, when the first AS and the second AS have a valid IP configuration for the identified BGP session, setting the status flag to a second value, querying a router syslog file associated with the router to identify a syslog BGP message associated with the BGP session, determining whether the BGP session is stale based on the identified syslog BGP message, and when the BGP session is not stale and the status flag is set to the second value, adding a third value representative of the second AS to a list of actual AS neighbors of the first AS.

A disclosed example apparatus includes a parser to parse a router configuration file to form a first list of configured BGP sessions, each configured BGP session of the first list having an associated status flag, a filterer to process a router syslog file to form a second list of stale BGP sessions, an analyzer to process BGP data to form a third list of active AS neighbors, and a builder to form a fourth list of actual AS neighbors based on the first, second and third lists.

In the interest of brevity and clarity, throughout the following disclosure references will be made to an example communication system 100 of FIG. 1. However, the methods and apparatus described herein to infer the status of BGP sessions, and/or to create a list of actual AS interconnections and/or relationships are applicable to other types of networks constructed using other network technologies, topologies and/or protocols.

Figure 1:
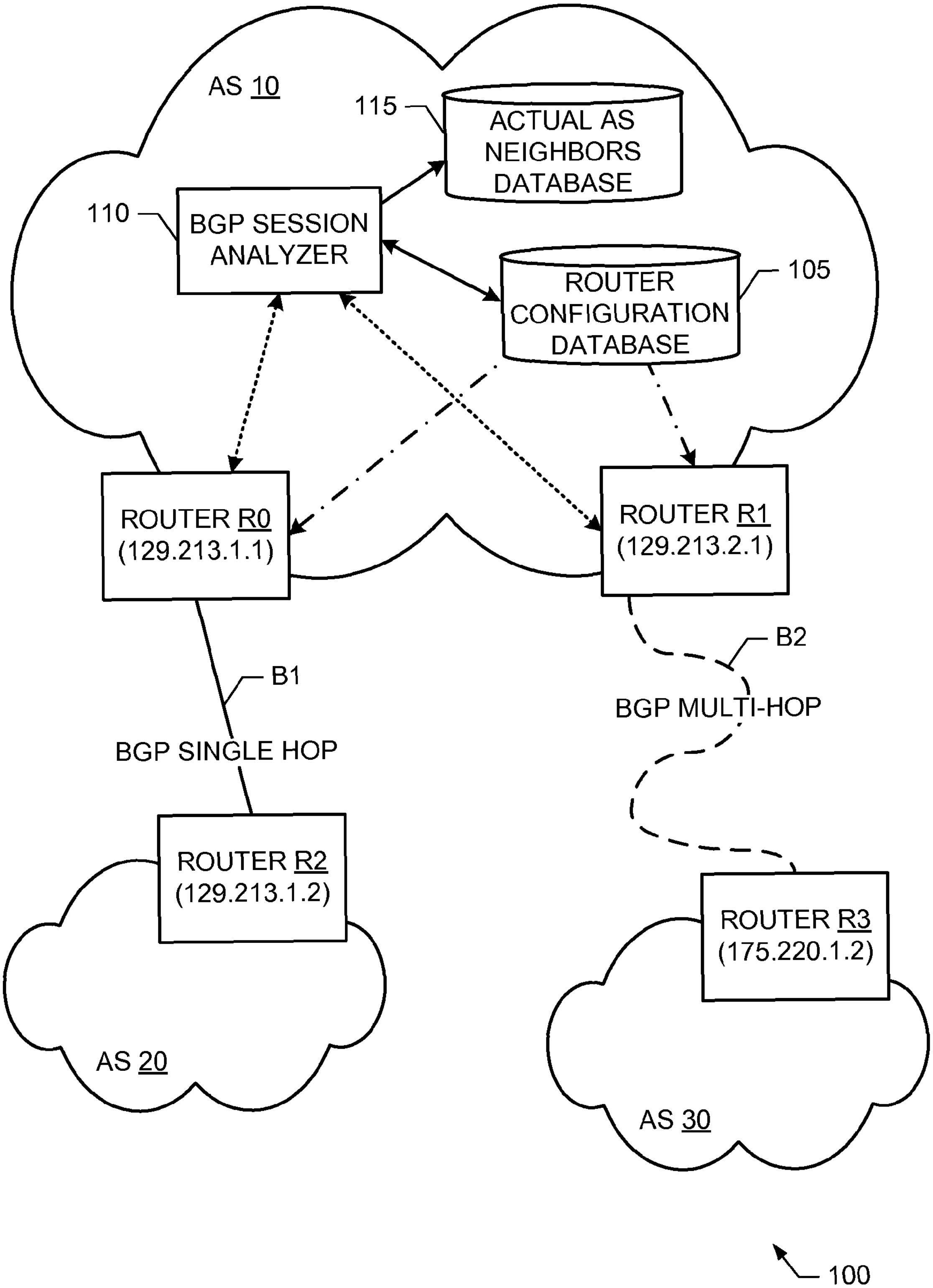
FIG. 1 is a schematic illustration of example communication system constructed in accordance with the teachings of this disclosure.

FIG. 1 illustrates the example communication system 100. The example communication system 100 of FIG. 1 includes a plurality of individual ASes, three of which are designated are reference numerals 10, 20 and 30, which are interconnected via a plurality of routers, four of which are designated at reference numerals R0, R1, R2 and R3. The example AS 10 of FIG. 1 is communicatively coupled to the example neighbor AS 20 via routers R0 and R2 via a single-hop BGP session B1. The example AS 10 is also communicatively coupled to the example neighbor AS 30 via routers R1 and R3 via a multi-hop BGP session B2. The example BGP sessions B1 and B2 of FIG. 1 are used by the routers R0-R3 to exchange routing information via, for example, BGP route advertisements and/or BGP router announcements in accordance with any past, present and/or future BGP protocol, BGP standard, BGP specification and/or BGP recommendation. The example router R0 of FIG. 1 is provisioned with an IP address of 129.213.1.1, the example router R1 is provisioned with an IP address of 129.213.2.1, the example router R2 is provisioned with an IP address of 129.213.1.2, and the example router R3 is provisioned with an IP address of 175.220.1.2.

The example routers R0 and R1 of the AS 10 of FIG. 1 are configured from and/or based on a router configuration database 105. The example configuration database 105 of FIG. 1 contains IP configuration information or data, and/or an IP configuration file for each of the routers R0 and R1 of the example AS 10. The IP configuration information, data and/or file for a particular router R0, R1 defines the IP connectivity configured for and/or provisioned to that router R0, R1. IP configuration data may be stored in the example router configuration database 105 using any number and/or type(s) of data structures. The example router configuration database 105 of FIG. 1 may be implemented using any number and/or type(s) of memory(-ies) and/or memory devices (not shown).

Before a router R0, R1 of the example AS 10 of FIG. 1 is able to setup a BGP session B1, B2 to any of the remote ASes 20, 30, the router R0, R1 has to have a minimum, suitable and/or applicable configuration state. For example, so that the router R0 can utilize and/or establish the example BGP session B1, the router R0 has to include information related to the AS 20. In particular, the IP configuration for the router R0 needs to include an entry "neighbor 129.213.1.2 remote-as 20," where the value 20 represents the AS 20. The router R0 also needs to have IP routing information that includes the router R2, such as an IP subnet defined for a local network interface of the router R0 that includes the IP address 129.213.1.2 of the remote router R2. For example, the IP configuration for the router R0 could include an entry "ip address 192.213.1.1 255.255.255.252," where 255.255.255.252 is a subnet mask; or an entry "ip route 129.213.1.0 255.255.255.252 Serial4/1/1/24:0," which defines a static route to the router R2, and where Serial4/1/1/24:0 refers to the local network interface of the router R0.

Likewise, the IP configuration for the example router R1 needs to include an entry "neighbor 175.220.1.2 ebgp-multi-hop 3," to enable the BGP session B2 between the routers R1 and R3, where the number 3 in the example entry indicates the number of IP hops between the routers R1 and R3. The example router R1 also needs to be configured with IP routing information that allows the router R0 to reach the router R3 by performing a longest prefix matching of 175.220.1.2 in its routing table.

To infer the status of BGP sessions (for example, the BGP sessions B1 and B2) of the example communication system 100, the example AS 10 of FIG. 1 includes a BGP session analyzer 110. The example BGP session analyzer 110 of FIG. 1 (a) parses the router configuration database 105 to compile a list of configured BGP sessions; (b) obtains syslog files from the routers R0 and R1, and filters the obtained syslog files to compile a list of stale BGP sessions; (c) obtains BGP data from the routers R0 and R1, and processes the obtained BGP data to compile a list of active AS neighbors; and (d) compiles a list of actual communicatively coupled neighbor ASes based on the list of configured BGP sessions, the list of stale BGP sessions and the list of active AS neighbors. An example manner of implementing the example BGP session analyzer 110 of FIG. 1 is described below in connection with FIG. 2. Example processes that may be carried out to implement the example BGP session analyzer 110 are described below in connection with FIGS. 4-8.

By inferring the status of BGP sessions of the AS 10 (for example, the BGP sessions B1 and B2), the example BGP session analyzer 110 can compile a list of current and/or actual neighbor ASes of the example AS 10. That is, when at least one valid BGP session exists between the AS 10 and another AS (for example, the AS 20), that AS is added to the list of actual neighbor ASes. Thus, the compiled list of actual neighbor ASes represents an inferred connectivity map for the AS 10 and/or, more generally, for the example communication system 100 of FIG. 1.

The example BGP session analyzer 110 of FIG. 1 compiles the list of actual AS neighbors without having to interrogate the routers of the other ASes (for example, without having to interrogate the routers R2 and R3). Moreover, the list of actual AS neighbors is compiled by the BGP session analyzer 110 without having to repeatedly run throughout a study period using a command, such as "show ip bgp sum." The repeated execution of such a command for all of the routers R0-R3 is generally infeasible because the BGP session analyzer 110 typically does not have access to the routers of other ASes. Moreover, it is impossible to obtain historic "show ip bgp sum" data for a past period during which the command was not run. Thus, as described more fully below in connection with FIGS. 2-8, the example BGP session analyzer 110 of FIG. 1 infers the list of actual AS neighbors using only information obtained and/or obtainable within the AS 10.

To store a compiled list of actual neighbor ASes, the example AS 10 of FIG. 1 includes a actual AS neighbors database 115. Using any number and/or type(s) of data structures, the example actual AS neighbors database 115 of FIG. 1 stores a list of neighbor ASes of the AS 10 as inferred by the example BGP session analyzer 110. The example actual AS neighbors database 115 of FIG. 1 may be implemented using any number and/or type(s) of memory(-ies) and/or memory devices.

While an example communication system 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example routers R0-R3, the example router configuration database 105, the example BGP session analyzer 110, and/or the example actual AS neighbor database 115 of FIG. 1 may be implemented by hardware, software, firmware and/or any combination of hardware, software and/or firmware. Thus, for example, any of the example routers R0-R3, the example router configuration database 105, the example BGP session analyzer 110, and/or the example actual AS neighbor database 115 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a communication system may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
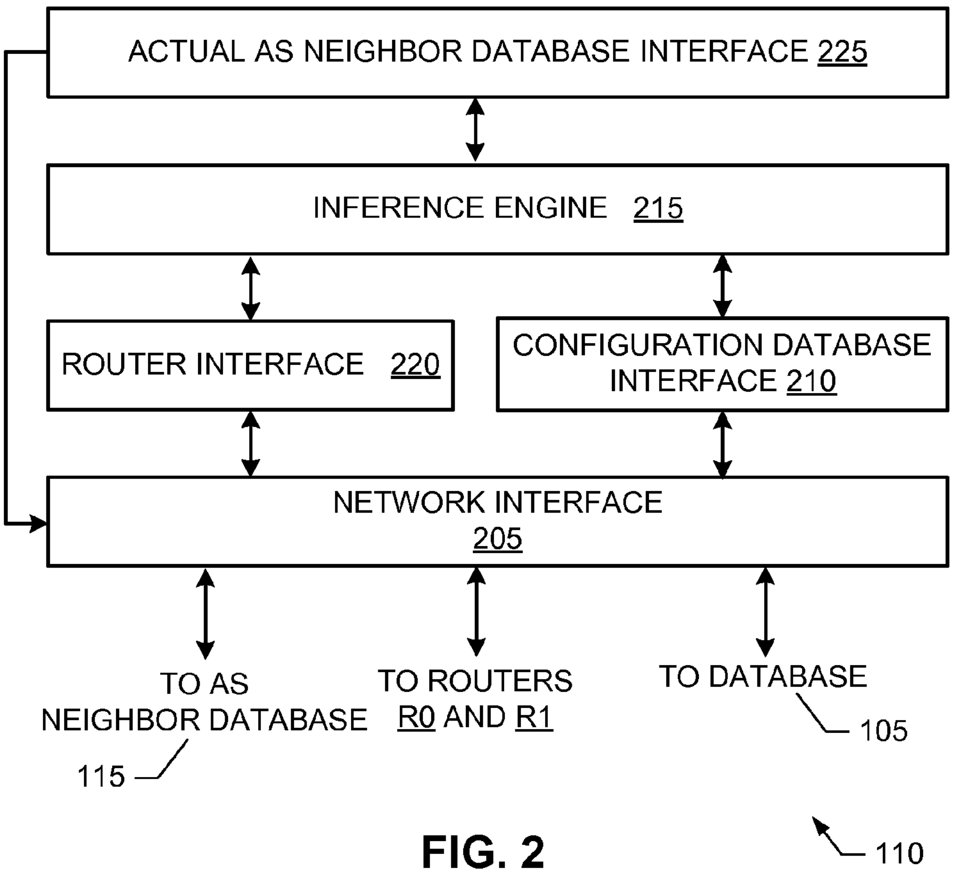
FIG. 2 illustrates an example manner of implementing a BGP session analyzer for the example communication system of FIG. 1.

FIG. 2 illustrates an example manner of implementing the example BGP session analyzer 110 of FIG. 1. To implement one or more interfaces to the example routers R0 and R1, the example router configuration database 105 and/or the example actual AS neighbors database 110, the example BGP session analyzer 110 of FIG. 2 includes any type(s) and/or number of network interfaces, one of which is designated at reference numeral 205. An example network interface 205 is implemented in accordance with any past, present and/or future standard, recommendation and/or specification for Ethernet transceivers.

To obtain router configuration information, the example BGP session analyzer 110 of FIG. 2 includes any type of configuration database interface 210. Using any number and/or type(s) of method(s) and/or application programming interface(s), the example configuration database interface 210 allows an inference engine 215 to obtain data and/or information representative of provisioned and/or configured BGP sessions for the example AS 10 (FIG. 1).

To obtain router syslog files and/or BGP data, the example BGP session analyzer 110 of FIG. 2 includes any type of router interface 220. Using any number and/or type(s) of method(s) and/or application programming interface(s), the example router interface 220 allows the example inference engine 215 to obtain router syslog files and/or BGP session data from the example routers R0 and R1 of the example AS 10 (FIG. 1).

To store AS neighbor information, the example BGP session analyzer 110 of FIG. 2 includes any type of actual AS neighbor database interface 225. Using any number and/or type(s) of method(s) and/or application programming interface(s), the example actual AS neighbor database 220 allows the example inference engine 215 to store a list of actual AS neighbors in the example actual AS neighbor database 115 (FIG. 1).

To infer the status of BGP sessions, the example BGP session analyzer 110 of FIG. 2 includes the example inference engine 215. The example inference engine 215 of FIG. 2: (a) obtains router configuration data from the router configuration database 105 via the configuration database interface, (b) parses the obtained router configuration information to compile a list of configured and/or provisioned BGP sessions, (c) obtains syslog files from routers of the AS 10 (for example, from the routers R0 and R1) via the example router interface 220, (d) filters the obtained syslog files to compile a list of stale BGP sessions, (e) obtains BGP session data from the routers of the AS 10 via the example router interface 220, (f) processes the obtained BGP data to compile a list of active AS neighbors, (g) compiles a list of communicatively coupled neighbor ASes based on the list of configured BGP sessions, the list of stale BGP sessions and the list of active AS neighbors, and (h) stores the compiled list of actual neighbor ASes in the example actual AS neighbors database 115 (FIG. 1) via the actual AS neighbor database interface 225. An example manner of implementing the example BGP inference engine 215 of FIG. 2 is described below in connection with FIG. 3. Example processes that may be carried out to implement the example inference engine 215 are described below in connection with FIGS. 4-8.

While an example manner of implementing the example BGP session analyzer 110 of FIG. 1 has been illustrated in FIG. 2, one or more of the interfaces, data structures, elements, processes and/or devices illustrated in FIG. 2 may be combined, divided, re-arranged, omitted, eliminated and/or implemented in any other way. Further, the example network interface 205, the example router configuration database interface 210, the example inference engine 215, the example router interface 220, the example actual AS neighbor database interface 225 and/or, more generally, the example BGP session analyzer 110 of FIG. 2 may be implemented by hardware, software, firmware and/or any combination of hardware, software and/or firmware. Thus, for example, any of the example network interface 205, the example router configuration database interface 210, the example inference engine 215, the example router interface 220, the example actual AS neighbor database interface 225 and/or, more generally, the example BGP session analyzer 110 may be implemented by one or more circuit(s), programmable processor(s), ASIC(s), PLD(s) and/or FPLD(s), etc. Further still, a BGP session analyzer may include interfaces, data structures, elements, processes and/or devices instead of, or in addition to, those illustrated in FIG. 2 and/or may include more than one of any or all of the illustrated interfaces, data structures, elements, processes and/or devices. For example, a BGP session analyzer may implement network interfaces for respective ones of the example router configuration database interface 210, the example router interface 220, and the example actual AS neighbor database interface 225.

Figure 3:
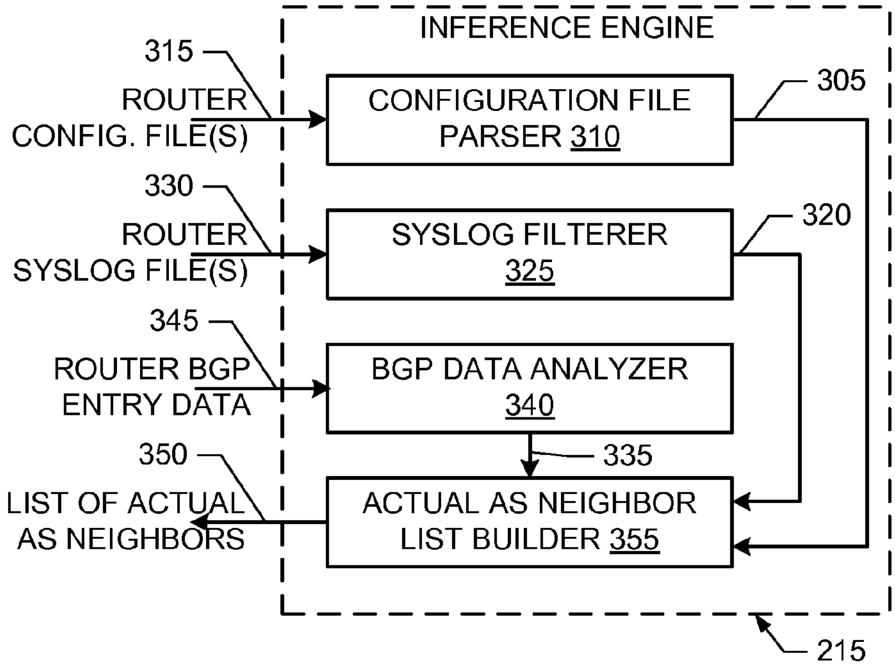
FIG. 3 illustrates an example manner of implementing an inference engine for the example BGP session analyzer of FIG. 2.

FIG. 3 illustrates an example manner of implementing the example inference engine 215 of FIG. 2. To compile a list 305 of configured and/or provisioned BGP sessions, the example inference engine 215 of FIG. 3 includes a configuration file parser 310. For each router of the example AS 10, the example configuration parser 310 of FIG. 3 obtains the router configuration information 315 for the router from the router configuration database 105 (FIG. 1) via the example router configuration database interface 210 (FIG. 2). The example configuration parser 310 parses the router configuration file 315 to compile the list 305 of configured and/or provisioned BGP sessions by, for example, carrying out the example process of FIG. 5.

To compile a list 320 of stale BGP sessions, the example inference engine 215 of FIG. 3 includes a syslog filterer 325. The example syslog filterer 325 of FIG. 3 obtains from each router of the example AS 10 its syslog file 330 via the example router interface 220 (FIG. 2). For each BGP session identified in the syslog file 330, the example syslog filterer 325 locates the most recent syslog BGP message, and if the syslog BGP message is stale adds the BGP session to the list 320 of stale BGP sessions by, for example, carrying out the example process of FIG. 6. As described below in connection with FIG. 8, the list 320 of stale BGP sessions can be used to determine whether any configured BGP sessions 305 identified by the example configuration file parser 310 are not actively and/or currently being used. Such stale BGP sessions 320 may be associated with ASes that were originally configured as neighbor ASes of the example AS 10 but are, in fact, not longer active, actual and/or current AS neighbors. In the examples described herein, such inactive and/or non-current AS neighbors are not included in the list of actual AS neighbors of the AS 10.

To compile a list 335 of active AS neighbors, the example inference engine 215 of FIG. 3 includes a BGP data analyzer 340. The example BGP data analyzer 340 of FIG. 3 obtains from each router of the example AS 10 its BGP data 345 via the example router interface 220 (FIG. 2). For each BGP session included in the BGP data 345, the example BGP data analyzer 340 adds a value representative of the neighbor AS to the list of active AS neighbors 335 by, for example, carrying out the example process of FIG. 7. As described below in connection with FIG. 8, the list 335 of active AS neighbors can be used to ensure that active AS neighbors 335 of the AS 10 are included in a list 350 of actual AS neighbors even when such active AS neighbors 335 may be associated with one or more of incorrect and/or incomplete IP configuration(s) and/or stale BGP session(s). Thus, the example list 335 of active AS neighbors is used to help ensure completeness of the example list 350 of actual AS neighbors.

To compile the list 350 of actual AS neighbors, the example inference engine 215 of FIG. 3 includes an actual AS neighbor list builder 355. By, for example, carrying out the example process of FIG. 8, the example list builder 355 of FIG. 3 compiles the list 350 of actual AS neighbors based on the compiled list 305 of configured BGP sessions, the list 320 of stale BGP sessions, and the list 335 of active AS neighbors.

While an example manner of implementing the example inference engine 215 of FIG. 2 has been illustrated in FIG. 3, one or more of the interfaces, data structures, elements, processes and/or devices illustrated in FIG. 3 may be combined, divided, re-arranged, omitted, eliminated and/or implemented in any other way. Further, the example configuration file parser 310, the example syslog filterer 325, the example BGP data analyzer 340, the example actual AS neighbor list builder 355 and/or, more generally, the example inference engine 215 of FIG. 3 may be implemented by hardware, software, firmware and/or any combination of hardware, software and/or firmware. Thus, for example, any or the example configuration file parser 310, the example syslog filterer 325, the example BGP data analyzer 340, the example actual AS neighbor list builder 355 and/or, more generally, the example inference engine 215 may be implemented by one or more circuit(s), programmable processor(s), ASIC(s), PLD(s) and/or FPLD(s), etc. Further still, an inference engine may include interfaces, data structures, elements, processes and/or devices instead of, or in addition to, those illustrated in FIG. 3 and/or may include more than one of any or all of the illustrated interfaces, data structures, elements, processes and/or devices.

FIG. 4 illustrates a flowchart representative of an example process that may be carried out to implement the example inference engine 215 and/or the example BGP session analyzer 110 of FIGS. 1 and/or 2. FIGS. 5-8 contain pseudo-code representative of example processes that may be carried out to implement the example configuration file parser 310, the example syslog filterer 325, the example BGP data analyzer 340, the example list builder 355, respectively, and/or, more generally the example inference engine 215 and/or the example BGP session analyzer 110.

The example processes of FIGS. 4-8 may be carried out by a processor, a controller and/or any other suitable processing device. For example, the example processes of FIGS. 4-8 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible and/or machine-readable instructions or data structures, and which can be accessed by a processor, a general-purpose or special-purpose computer, or other machine with a processor (e.g., the example processor platform P100 discussed below in connection with FIG. 9). Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example processes of FIGS. 4-8 may be implemented using any combination(s) of ASIC(s), PLD(s), FPLD(s), discrete logic, hardware, firmware, etc. Also, some or all of the example processes of FIGS. 4-8 may instead be implemented manually or as any combination of any of the foregoing techniques, for example, any combination of firmware, software, discrete logic and/or hardware. Further, many other methods of implementing the example operations of FIGS. 4-8 may be employed. For example, the order of execution of the blocks may be changed, and/or one or more of the blocks described may be changed, eliminated, sub-divided, or combined. Additionally, any or all of the example processes of FIGS. 4-8 may be carried out sequentially and/or carried out in parallel by, for example, separate processing threads, processors, devices, discrete logic, circuits, etc.

The example process of FIG. 4 begins with the example configuration file parser 310 (FIG. 3) obtaining for each a router of the example AS 10 its configuration file from the router configuration database 105 and parsing the configuration files to compile a list 305 of configured BGP sessions by, for example, carrying out the example process of FIG. 5 (block 405).

The example syslog filterer 325 (FIG. 3) obtains from each router of the example AS 10 its syslog file and filters the syslog files to compile a list 320 of stale BGP sessions by, for example, carrying out the example process of FIG. 6 (block 410).

The example BGP data analyzer 340 (FIG. 3) obtains from each router of the example AS 10 its BGP data and analyzes the BGP data to compile a list 335 of active AS neighbors by, for example, carrying out the example process of FIG. 7 (block 415).

The example actual AS neighbor list builder 355 (FIG. 5) compiles a list 350 of actual AS neighbors based on the list 305 of configured BGP sessions, the list 320 of stale BGP sessions, and the list 335 of active AS neighbors by, for example, carrying out the example process of FIG. 8 (block 420). Control then exits from the example process of FIG. 4.

The example process of FIG. 5 processes each line of the configuration file for each router (lines 505). At each line, the example configuration file parser 310 (FIG. 3) determines whether the line matches a first regular expression 510. If the line matches the first regular expression 510, the example configuration file parser 310 hashes a value Y representative of a neighbor AS using a hash index comprising a string R representative of the currently considered router and a string X (for example, an IP address) representative of a remote router associated with the neighbor AS. The configuration file parser 310 also hashes a status flag having a value of FALSE (for example, a value of zero) using the same hash index (lines 512)

If the line matches a second regular expression 515, the example configuration file parser 310 hashes a value Y representative of the neighbor AS using a hash index comprising a string R representative of the currently considered router and a string X (for example, an IP address) representative of a remote router associated with the neighbor AS. The configuration file parser 310 also hashes a status flag having a value of TRUE (for example, a value of one) using the same hash index (lines 517).

The example configuration parser 310 processes each line of the configuration file for each router a second time (lines 520). At each line, the example configuration file parser 310 determines whether the line matches a third regular expression 525. If the line matches the third regular expression 525, the example configuration file parser 310 examines the string X (for example, an IP address) of each hash entry to determine whether the string X is included in a value M (for example, an IP subnet mask) extract via the regular expression 525. If the string is included in the value M, the status flag associated with the hash entry is update to TRUE (lines 527).

If the line matches the fourth regular expression 530, the example configuration file parser 310 examines the string X (for example, an IP address) of each hash entry to determine whether the string X is included in a value M (for example, an IP subnet mask) extract via the regular expression 530. If the string is included in the value M, the status flag associated with the hash entry is update to TRUE (lines 532). Control then exits from the example process of FIG. 5.

The example process of FIG. 6 processes a syslog file for a router R. For each BGP session identified in the syslog file (for example, for each combination of R and remote router X), the example syslog filterer 325 searches for the more recent syslog BGP message (line 605). The example syslog filterer 325 (FIG. 3) obtains a timestamp associated with the most recent syslog BGP message (line 610). If the most recent syslog BGP message is a Peer Down message and the timestamp indicates that the syslog BGP message is less than one month old (line 615), the syslog filter 325 hashes a flag having a value of TRUE using a hash index comprising a string R representative of the currently considered router and a string X (for example, an IP address) representative of a remote router associated with the syslog BGP message (line 620).

If the most recent syslog BGP message is not a Peer Down or is older than one month (line 615), the syslog filterer 325 determines whether syslog BGP message is less than one year old (line 625). If the syslog BGP message is less than one year old (line 625), the syslog filterer 325 hashes a flag having a value of TRUE using a hash index comprising a string R representative of the currently considered router and a string X (for example, an IP address) representative of a remote router associated with the syslog BGP message (line 630). When the entire syslog file has been processed, control exits from the example process of FIG. 6.

The example thresholds of one month and one year utilized in FIG. 6 were empirically selected to balance the likelihood of false positive with the likelihood of false negatives. That is, the example thresholds of FIG. 6 were selected to reduce the likelihood that a BGP session is incorrectly identified as stale and/or incorrectly identified as active. In general, lower thresholds result in higher incidences of falsely identifying a BGP session as stale and higher thresholds result in higher incidences of missing a BGP session that is in fact stale.

While example thresholds are shown in FIG. 6, other thresholds may be selected based on any number and/or type(s) of criteria.

The example process of FIG. 7 processes each BGP entry of a router BGP data (line 705). For each BGP entry (line 705), the example BGP data analyzer 340 (FIG. 3) extracts a value of the AS associated with the last hop from the ASPATH BGP attribute of the BGP entry (line 710). The BGP data analyzer 340 hashes the AS value (line 715). After all BGP entries are processed, control exits from the example process of FIG. 7.

The example process of FIG. 8 builds a list of actual AS neighbors. The example list builder 355 (FIG. 3) processes each hash entry created by the example configuration file parser 310 using, for example, the example process of FIG. 5 (line 805). For each has entry (line 805), the list builder 355 determines whether the associated hashed flag is TRUE and whether the associated BGP session is hashed in the list of stale BGP sessions created by the example syslog filterer 325 using, for example, the example process of FIG. 6 (line 810). If the flag is TRUE and the associated BGP session is not stale (line 810), the list builder 355 recalls from the hash of configured BGP sessions the AS associated with the BGP session (line 815) and adds the AS to the list of actual AS neighbors (line 820).

When all hash entries have been processed (line 805), the list builder 355 adds any active AS neighbors hashed by the example BGP data analyzer 350 using, for example, the example process of FIG. 7 to the list of actual AS neighbors (lines 835). Control then exits from the example process of FIG. 8.

Figure 9:
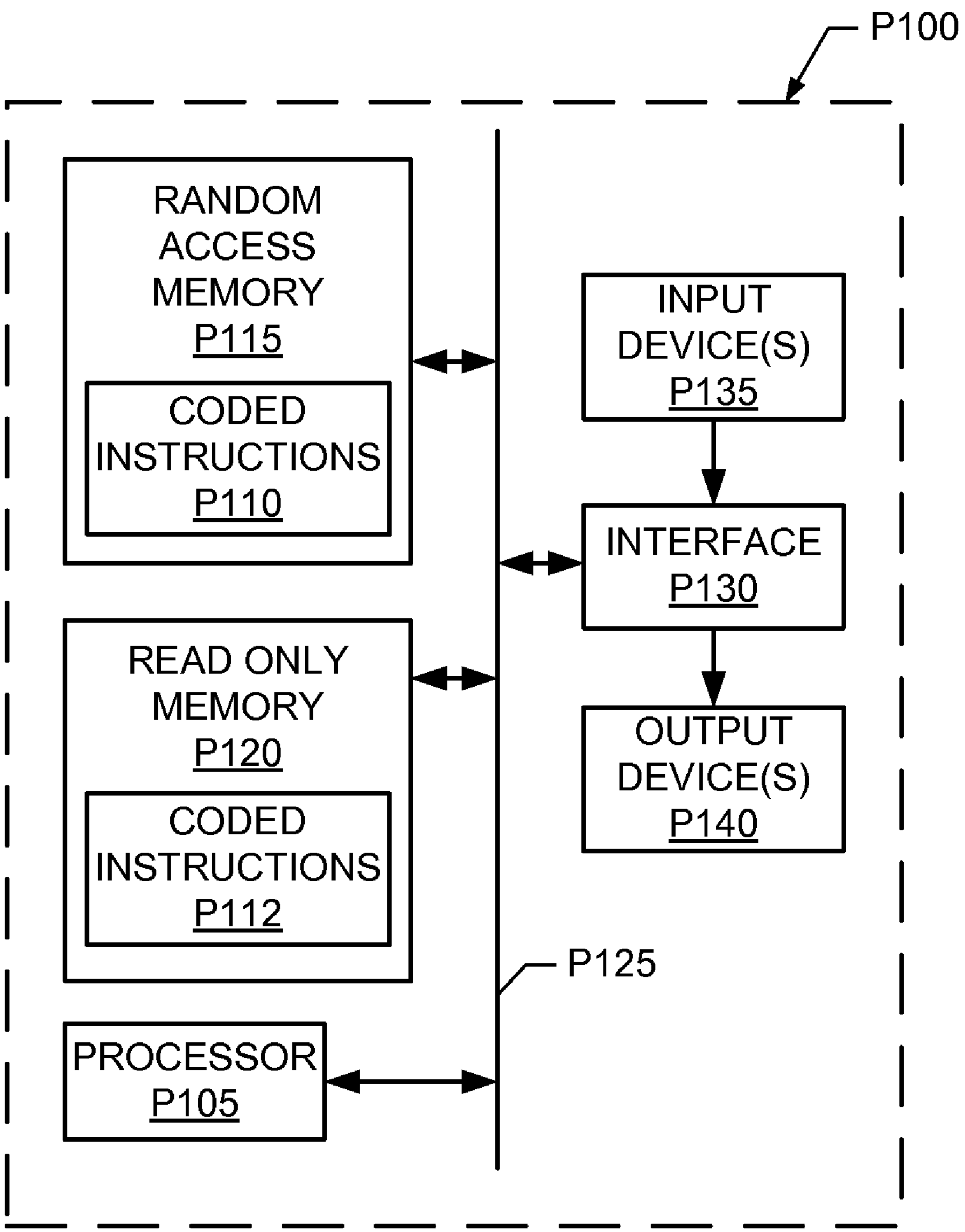
FIG. 9 is a schematic illustration of an example processor platform that may be used and/or programmed to carry out the example processes of FIGS. 4-8 and/or to implement any of all of the methods and apparatus disclosed herein.

FIG. 9 is a schematic diagram of an example processor platform P100 that may be used and/or programmed to implement the example BGP session analyzer 110 and/or the example inference engine 215 of FIGS. 1-3. For example, the processor platform P100 can be implemented by one or more general-purpose processors, processor cores, microcontrollers, etc.

The processor platform P100 of the example of FIG. 9 includes at least one general-purpose programmable processor P105. The processor P105 executes coded instructions P110 and/or P112 present in main memory of the processor P105 (e.g., within a RAM P 115 and/or a ROM P 120). The processor P 105 may be any type of processing unit, such as a processor core, a processor and/or a microcontroller. The processor P105 may execute, among other things, the example processes of FIGS. 4-8 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P 120 may be used to implement the example router configuration database 105 and/or the example actual AS neighbor database 115 of FIG. 1.

The processor platform P 100 also includes an interface circuit P 130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the network interface 205 of FIG. 2.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:

querying a router configuration file associated with a router of a first autonomous system to identify a border gateway protocol session between the first autonomous system and a second autonomous system;

querying the router configuration file to determine whether the border gateway protocol session is a single hop border gateway protocol session;

when the border gateway protocol session is a single hop border gateway protocol session, setting a status flag associated with the border gateway protocol session to a first value;

querying the router configuration file to determine whether the first autonomous system and the second autonomous system have a valid Internet protocol configuration for the identified border gateway protocol session;

when the first autonomous system and the second autonomous system have a valid Internet protocol configuration for the identified border gateway protocol session, setting the status flag to a second value;

querying a router syslog file associated with the router to identify a syslog border gateway protocol message associated with the border gateway protocol session;

determining whether the border gateway protocol session is stale based on the identified syslog border gateway protocol message; and when the border gateway protocol session is not stale and the status flag is set to the second value, adding a third value representative of the second autonomous system to a list of actual autonomous system neighbors of the first autonomous system.

2. A method as defined in claim 1, further comprising when the border gateway protocol session is a multi-hop border gateway protocol session, setting the status flag to the second value.

3. A method as defined in claim 1, wherein determining whether the first autonomous system and the second autonomous system have a valid Internet protocol configuration for the identified border gateway protocol session comprises determining whether a destination Internet protocol address associated with the border gateway protocol session is included in a range of valid Internet protocol addresses specified in the router configuration file.

4. A method as defined in claim 1, wherein determining whether the border gateway protocol session is stale based on the identified syslog border gateway protocol message comprises:

obtaining a timestamp associated with the syslog border gateway protocol message;

computing a difference between the time stamp and a current time; and comparing the difference to a threshold to determine whether the border gateway protocol session is stale.

5. A method as defined in claim 4, further comprising:

determining whether the syslog border gateway protocol message is a Peer Down syslog border gateway protocol message; and when the syslog border gateway protocol message is a Peer Down syslog border gateway protocol message, setting the threshold to a fourth value representative of one month.

6. A method as defined in claim 4, further comprising:

determining whether the syslog border gateway protocol message is a Peer Down syslog border gateway protocol message; and when the syslog border gateway protocol message is not a Peer Down syslog border gateway protocol message, setting the threshold to a fourth value representative of one year.

7. A method as defined in claim 1, further comprising:

querying border gateway protocol data associated with the router to determine whether a third autonomous system has a second border gateway protocol session with the first autonomous system; and when the third autonomous system has a second border gateway protocol session with the first autonomous system, adding a fourth value representative of the third autonomous system to the list of actual autonomous system neighbors.

8. A method as defined in claim 1, wherein the first value represents FALSE and the second value represents TRUE.

9. An apparatus comprising:

a parser to parse a router configuration file to form a first list of configured border gateway protocol sessions, each configured border gateway protocol session of the first list having an associated status flag;

a filterer to process a router syslog file to form a second list of stale border gateway protocol sessions;

an analyzer to process border gateway protocol data to form a third list of active autonomous system neighbors; and a builder to form a fourth list of actual autonomous system neighbors based on the first, second and third lists, wherein at least one of the parser, the filterer, the analyzer or the builder is implemented in hardware.

10. An apparatus as defined in claim 9, wherein the parser is to:

parse the router configuration file to identify a first entry having a regular expression of "neighbor <X> remote-as <Y>", the router configuration file associated with a router R;

when the first entry is found, add a hash entry indexed with R and X to the first list of configured border gateway protocol sessions with an associated status flag set to a first value;

parse the router configuration file to identify a second entry having a regular expression of at least one of "ip address <Z> <M>" or "ip address <Z> <M> <I>";

when the second entry is found, determine whether the first list includes a first border gateway protocol session represented by M; and when the first list includes the first border gateway protocol session, set the status flag associated with the first border gateway protocol session in the first list to a second value;

wherein the filterer is to:

search the router syslog file for a syslog border gateway protocol message, the syslog border gateway protocol message associated with the first border gateway protocol session;

determine whether a timestamp associated with the syslog border gateway protocol message indicates that the message is stale; and when the timestamp indicates that the syslog border gateway protocol message is stale, add the first border gateway protocol session to the second list of stale border gateway protocol sessions; and wherein the builder is to:

determine whether the first border gateway protocol session has an associated flag in the first list of configured border gateway protocol sessions that is set to the second value;

when the associated flag is set to the second value, determine whether the first border gateway protocol session is included in the second list of stale border gateway protocol sessions; and add a third value representative of a first autonomous system neighbor associated with the first border gateway protocol session to the fourth list of actual autonomous system neighbors when the associated flag is set to the second value and when the first border gateway protocol session is not included in the second list.

11. An apparatus as defined in claim 9, wherein the router configuration file, and router syslog file and the border gateway protocol data are associated with a first autonomous system, and wherein the fourth list of actual autonomous system neighbors have active border gateway protocol sessions with the first autonomous system.

12. An apparatus as defined in claim 11, further comprising a database interface to obtain the router configuration file from a configuration database associated with the first autonomous system.

13. An apparatus as defined in claim 11, further comprising a router interface to obtain the router syslog file and the border gateway protocol data from a router associated with the first autonomous system.

14. An apparatus as defined in claim 9, wherein the parser is to:

parse the router configuration file to identify an entry having a regular expression of "neighbor <X> remote-as <Y>", the router configuration file associated with a router R; and when the entry is found, add a hash entry indexed with R and X to the first list of configured border gateway protocol sessions with an associated status flag set to the first value.

15. An apparatus as defined in claim 9, wherein the parser is to:

parse the router configuration file to identify an entry having a regular expression of "neighbor <X> remote-as <Y> ebgp-multihop <n>", the router configuration file associated with a router R; and when the entry is found, add a hash entry indexed with R and X to the first list of configured border gateway protocol sessions with an associated status flag set to the second value.

16. An apparatus as defined in claim 9, wherein the parser is to:

parse the router configuration file to identify an entry having a regular expression of at least one of "ip address <Z> <M>" or "ip address <Z> <M> <I>";

when the entry is found, determine whether the first list includes a first border gateway protocol session included in M; and when the first list contains the first border gateway protocol session, modify a status flag associated with the first border gateway protocol session in the first list to the second value.

17. An apparatus as defined in claim 9, wherein the filterer is to:

search the router syslog file for a syslog border gateway protocol message, the syslog border gateway protocol message associated with a first border gateway protocol session;

determine whether a timestamp associated with the syslog border gateway protocol message indicates that the syslog border gateway protocol message is stale; and when the timestamp indicates that the syslog border gateway protocol message is stale, add the first border gateway protocol session to the second list of stale border gateway protocol sessions.

18. An apparatus as defined in claim 9, wherein the analyzer is to:

extract from a first ASPATH border gateway protocol attribute a last hop autonomous system neighbor identifier; and add the extracted last hop autonomous system neighbor identifier to the third list of active autonomous system neighbors.

19. An apparatus as defined in claim 9, wherein the builder is to:

identify a first border gateway protocol session having an associated flag in the first list of configured border gateway protocol sessions that is set to the second value;

determine whether the first border gateway protocol session is included in the second list of stale border gateway protocol sessions; and add a first value representative of a first autonomous system neighbor associated with the first border gateway protocol session to the fourth list of actual autonomous system neighbors when the associated flag is set to the second value and when the first border gateway protocol session is not included in the second list.

20. An apparatus as defined in claim 19, wherein the builder is to:

determine whether a second autonomous system neighbor included in the third list of active autonomous system neighbors is not included in the fourth list of actual autonomous system neighbors; and add a second value representative of the second autonomous system neighbor to the fourth list when the second autonomous system neighbor is not included in the fourth list.

21. An apparatus as defined in claim 9, wherein the first value represents FALSE and the second value represents TRUE.

22. A tangible article of manufacture excluding propagating signals and storing machine-readable instructions that, when executed, cause a machine to:

query a router configuration file associated with a router of a first autonomous system to identify a border gateway protocol session between the first autonomous system and a second autonomous system;

query the router configuration file to determine whether the border gateway protocol session is a multi-hop border gateway protocol session;

set a status flag associated with the border gateway protocol session to a first value when the border gateway protocol session is a single hop border gateway protocol session;

query the router configuration file to determine whether the first autonomous system and the second autonomous system have a valid Internet protocol configuration for the identified border gateway protocol session;

set the status flag to a second value when the first autonomous system and the second autonomous system have a valid Internet protocol configuration for the identified border gateway protocol session;

query a router syslog file associated with the router to identify a syslog border gateway protocol message associated with the border gateway protocol session;

determine whether the border gateway protocol session is stale based on the identified syslog border gateway protocol message; and add a third value representative of the second autonomous system to a list of actual autonomous system neighbors of the first autonomous system when the border gateway protocol session is not stale and the status flag is set to the second value.

23. An article of manufacture as defined in claim 22, wherein the machine-readable instructions, when executed, cause the machine to set the status flag to the second value when the border gateway protocol session is a multi-hop border gateway protocol session.

24. An article of manufacture as defined in claim 22, wherein the machine-readable instructions, when executed, cause the machine to determine whether the first autonomous system and the second autonomous system have a valid Internet protocol configuration for the identified border gateway protocol session by determining whether a destination Internet protocol address associated with the border gateway protocol session is included in a range of valid Internet protocol addresses specified in the router configuration file.

25. An article of manufacture as defined in claim 22, wherein the machine-readable instructions, when executed, cause the machine to determine whether the border gateway protocol session is stale by:

obtaining a timestamp associated with the syslog border gateway protocol message;

computing a difference between the time stamp and a current time; and comparing the difference to a threshold to determine whether the border gateway protocol session is stale.

26. An article of manufacture as defined in claim 22, wherein the machine-readable instructions, when executed, cause the machine to:

query border gateway protocol data associated with the router to determine whether a third autonomous system has a second border gateway protocol session with the first autonomous system; and add a fourth value representative of the third autonomous system to the list of actual autonomous system neighbors when the third autonomous system has a second border gateway protocol session with the first autonomous system.

* * * * *